US008829062B1

(12) United States Patent
Minko et al.

(10) Patent No.: US 8,829,062 B1
(45) Date of Patent: Sep. 9, 2014

(54) STIMULI-RESPONSIVE POLYMER MEMBRANE AND METHOD OF MAKING THE SAME

(75) Inventors: Serigy Minko, Potsdam, NY (US); Maxim Orlov, Potsdam, NY (US); Ihor Tokarev, Potsdam, NY (US); Evengy Katz, Potsdam, NY (US)

(73) Assignee: Clarkson University, Potsdam, NY (US)

( * ) Notice: Subject to any disclaimer, the term of this patent is extended or adjusted under 35 U.S.C. 154(b) by 215 days.

(21) Appl. No.: 11/784,764

(22) Filed: Apr. 9, 2007

Related U.S. Application Data

(60) Provisional application No. 60/789,881, filed on Apr. 7, 2006.

(51) Int. Cl.
*C08J 9/26* (2006.01)
*C08J 9/14* (2006.01)
*B01D 67/00* (2006.01)
*B29C 44/34* (2006.01)

(52) U.S. Cl.
USPC ............ 521/61; 428/913; 428/315.5; 264/48; 264/53

(58) Field of Classification Search
USPC ............................................ 521/90; 524/104
See application file for complete search history.

(56) References Cited

U.S. PATENT DOCUMENTS 5,114,585 A * 5/1992 Kraus et al. .................. 210/490

OTHER PUBLICATIONS

Tokareva et al. "Nanosensors Based on Responsive Polymer Brushes and Gold Nanoparticle Enhanced Transmission Surface Plasmon Resonance Spectroscopy." 2004. American Chemical Society. (126), p. 15950-15951.*

* cited by examiner

*Primary Examiner* — Kara Boyle
(74) *Attorney, Agent, or Firm* — Gerow D. Brill

(57) ABSTRACT

The object of the present invention is concerned with a stimuli-responsive polymer membrane and method of making the same. The method and making the membrane is a new one The entire body of the responsive membrane is a gel. Gels are used as membranes because they are permeable-swollen network. This disclosure discusses a new combination of cylindrical pores in a swollen network. When the network swells or shrinks the cylindrical pores open or close. Thus, inside the network, one can introduce ligands, function groups which due to specific interaction with some signaling molecules in the surrounding environment can cause swelling or shrinking the membrane and this way they open or close pores. With cylindrical pores in a gel there is the ability to regulate pore size in a broad range and an ability to arrange response by adding some functional groups inside the gel body.

9 Claims, 17 Drawing Sheets

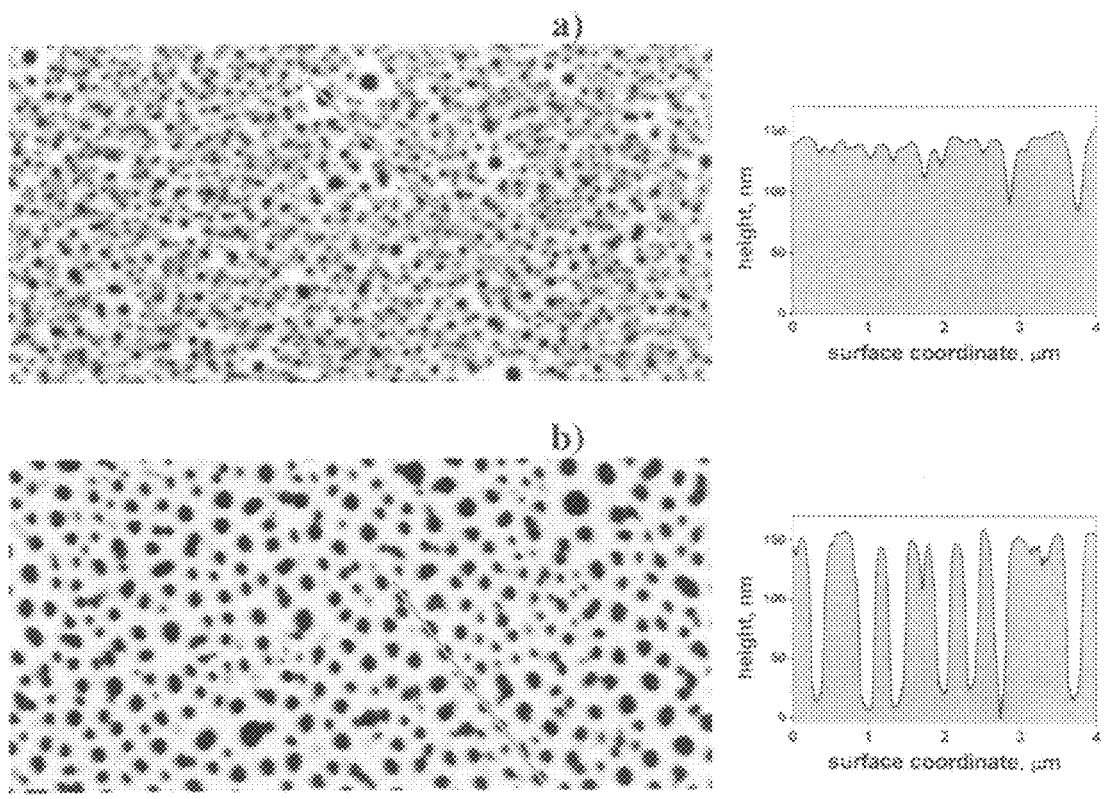
Figures 2 a and b

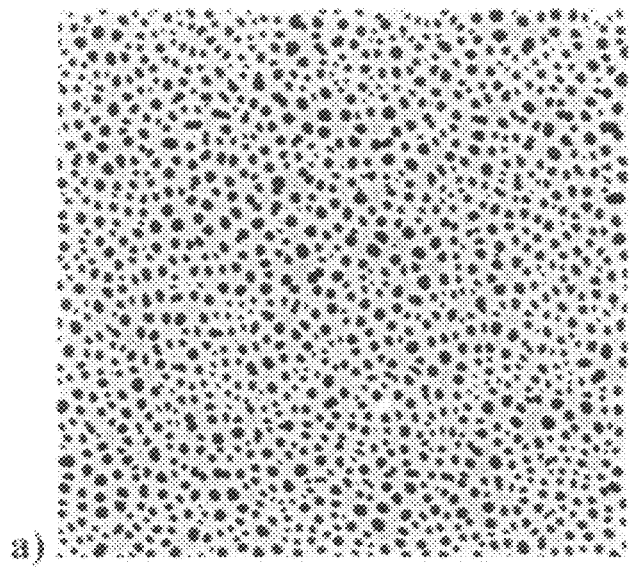
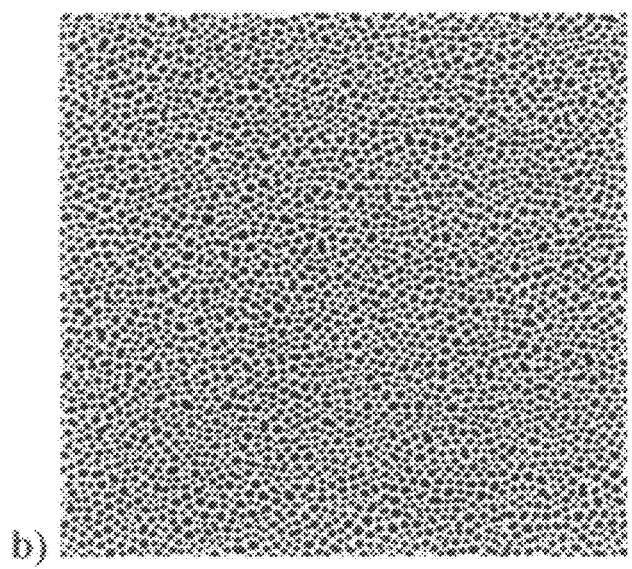
Figures 4 a and b

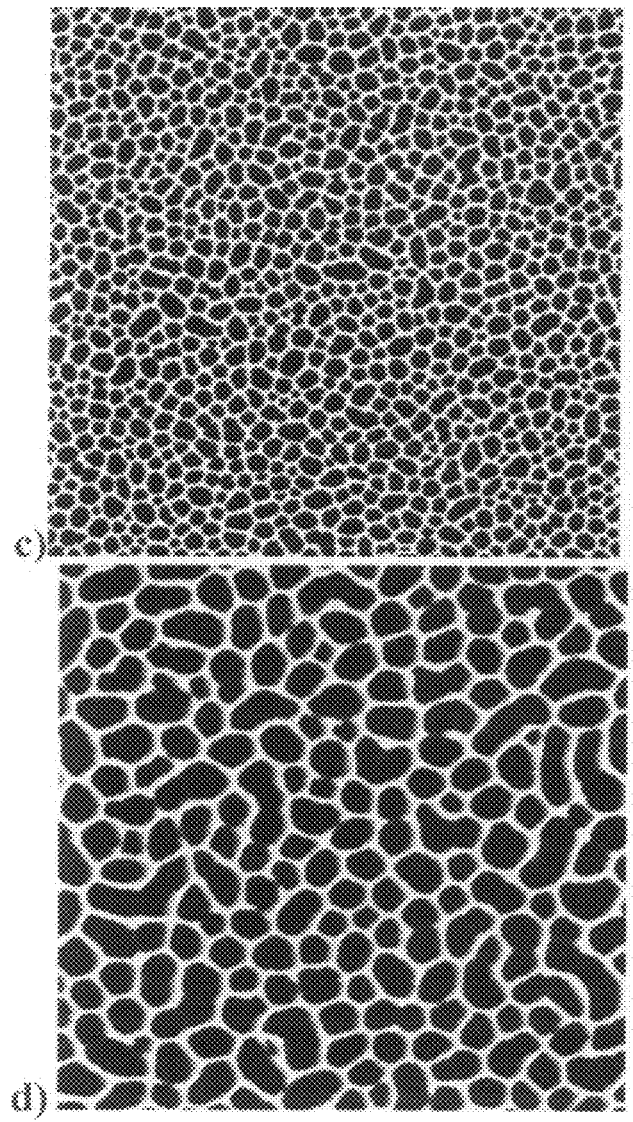
Figures 4 c and d .

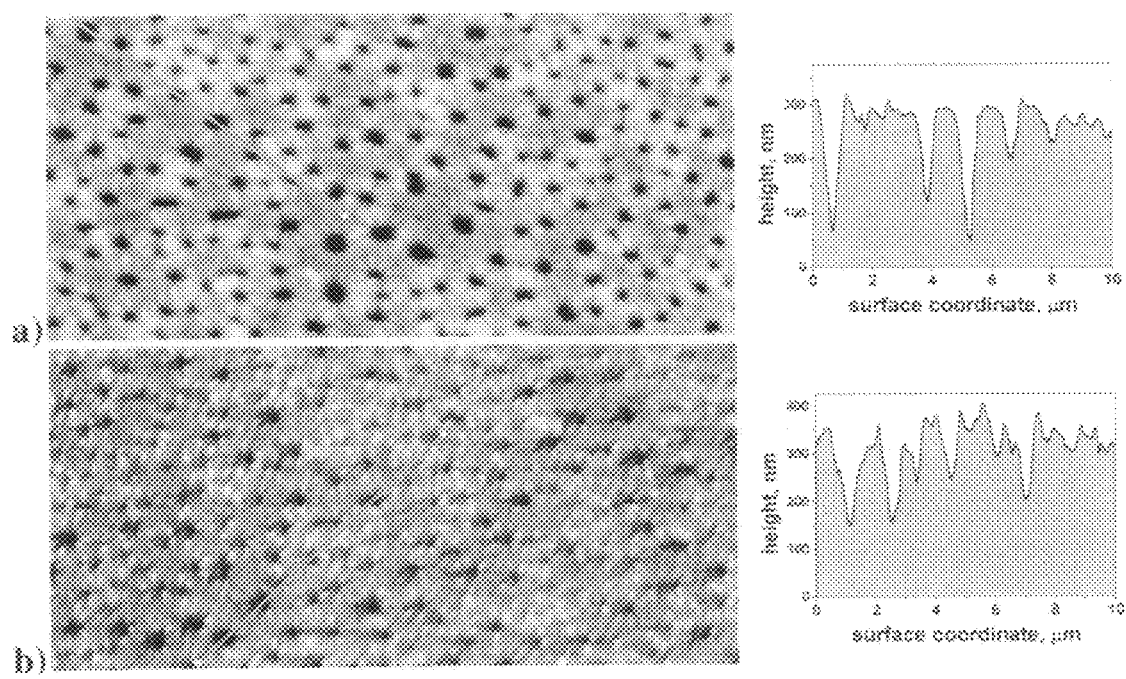
Figures 5a and b.

STIMULI-RESPONSIVE POLYMER MEMBRANE AND METHOD OF MAKING THE SAME

CROSS REFERENCE

This application is related to provisional application Ser. No. 60/789,881 filed on Apr. 7, 2006 entitled Responsive Polymer Membrane and Method of Making the Same and is hereby incorporated herein by reference.

STATEMENT REGARDING FEDERALLY SPONSORED RESEARCH

Financial support for this research was provided by the U.S. Army Research Office (Grant No. W911NF-05-1-0339).

FIELD OF INVENTION

The field of invention comprises a method of membrane fabrication where the entire body of a responsive membrane is a gel.

BACKGROUND OF THE INVENTION

In the past two decades, synthesis of responsive membranes with pores that could be opened and closed by changing chemical or physical properties of their environment has been the subject of many publications (see Mathias Ulbricht's work cited below and hereby incorporated herein by reference for a recent review). See Altinkaya, S. A., Yenal, H., and Ozbas, B.; Apel, P.; Yan, F., and Goedel, W. A.; Yan, F.; Goedel, W. A.; Jiang, P., Hwang, K. S., Mittleman, D. M., Bertone, J. F., and Colvin, V. L.; Cassagneau, T., and Caruso F., Park, S. H. and Xia, Y. N.; and Jiang, P., Bertone, J. F. and Colvin, V. L.; all hereby incorporated herein by reference. In most studies the variable pore permeability was attained by the surface modification of commercial microfiltration membranes using polymers that expand or contract in response to external stimuli. Radiation and plasma-induced graft-polymerizations are employed to immobilize a monolayer of surface-attached responsive polymer chains (brush-like layers) or cross-linked polymer networks (gels) on the membrane and/or pore surfaces. Stimuli-induced changes of the conformation of the grafted polymer chains affected the permeability of nanometer-sized pores in the membranes. Responsive gels are used to fill the interior of larger submicron/micron pores and regulate the membrane permeability. Membranes sensitive to changes of temperature, pH, ionic strength, light intensity, red-ox state of functional groups, and concentration of various substances have thus been fabricated based on the above-mentioned principles. The application of such stimulus-responsive membranes or "chemical valves" (functional gates) includes flow control, size-selective filtration, chemical and bioseparation, controlled release of chemical substances and drugs, and chemical sensors.

Microporous polymer membranes (pore size 0.01-20 μm) are widely used in industry, medicine, pharmacology, and research for separation and concentration of particles, colloids, proteins, enzymes, and cells. Phase inversion and track etching are well-established, commercially implemented techniques for the fabrication of such membranes. In the phase inversion technique, a solvent for a polymer turns into a non-solvent causing the polymer precipitation; the non-solvent serves as a porogen that evaporates after the membrane formation. Phase inversion is usually achieved by immersion of a solution film into a coagulation bath with a non-solvent (immersion precipitation), by exposure to non-solvent vapor, or by temperature change (temperature-induced phase separation). Membranes prepared by this technique exhibit a highly porous inner structure represented by a continuous network of interconnected tortuous pores. Furthermore, the structure is usually asymmetric with a thin dense surface layer and a thick sponge-like basic layer. The surface layer determines the separation properties and the overall flow resistance of the membrane, while the basic layer acts as a mechanical support. See Altinkaya, S. A.; Yenal, H.; Ozbas, B. The track etch (TE) membranes are prepared using a two-step fabrication procedure. See Apel, P. First, a polymer film (polycarbonate or polyester) is exposed to a collimated beam of heavy ions that produce parallel tracks across the film. The tracks are then chemically etched forming cylindrical pores. Unlike the phase inversion membranes, the track etch membranes are characterized by uniform pore size and relatively low pore density resulting in the high flow resistance.

In addition to the above mentioned techniques, various template-assisted methods for the fabrication of microporous polymer membranes have been reported in the literature. Colloidal crystals (See Yan, F.; Goedel, W. A. (both); Jiang, P., Hwang, K. S., Mittleman, D. M., and Bertone, J. F., Colvin, V. L.; Cassagneau, T.; Caruso, F., Park, S. H., Xia, Y. N., and Jiang, P., Bertone, J. F., Colvin V. L.) and emulsion droplets (See Imhof, A.; Pine, D. J. hereby incorporated herein by reference) have been successfully implemented as templates for the fabrication of self-standing membranes. Microcontact molding See Odom, T. W., Love, J. C., Wolfe, D. B., Paul, K. E., and Whitesides, G. M. hereby incorporated herein by reference.) and casting of polymer layers on solid substrates with 2D pillar arrays (See Yan, X. H., Liu, G. J., Dickey, M., and Willson, C. G. hereby incorporated herein by reference.) was found to be feasible for the fabrication of thin film membranes. An elegant method for the fabrication of membranes with regular pore arrangement is based on controlled drying of a polymer solution cast as a layer on a solid substrate in a highly humid atmosphere. See Widawski, G., Rawiso, M., and Francois, B.; Yabu, H., Tanaka, M., Ijiro, K., and Shimomura, M.; Maruyama, N., Koito, T., Nishida, J., Sawadaishi, T., Cieren, X., Ijiro, K., Karthaus, O., and Shimomura, M.; Karthaus, O., Maruyama, N., Cieren, X., Shimomura, M., Hasegawa, H., Hashimoto, T.; and Srinivasarao, M., Collings, D., Philips, A.; and Patel, S. hereby incorporated herein by reference. Evaporation of a water-immiscible solvent leads to cooling of the solution surface and, consequently, to condensation of a monolayer of hexagonally arranged water droplets that gradually sink into the solution. As the solvent evaporates and the polymer vitrifies, the droplets evaporate leaving pores behind. Polyelectrolyte layer-by-layer assembly (See Li, Q., Quinn, J. F., Caruso, F. hereby incorporated herein by reference.) and self-assembly of hollow micelles from rod-coil block copolymer represent another, non-template strategy for the fabrication of microporous layers. See Jenekhe, S. A., and Chen, X. L. and Ulbricht, M. both hereby incorporated herein by reference.

Over the past decade, numerous studies are devoted to the fabrication of membranes with variable permeability; specifically, the membranes which pore size can change in response to external stimuli (responsive membranes). Such membranes are of potential interest for a variety of applications, e.g., flow regulation, size- and charge-selective filtration and fractionation, encapsulation of living cells, controlled drug release, and sensors. The common approach for the fabrication of responsive membranes consists of the surface modification (e.g., by graft polymerization) of a premade membrane (usually commercial TE and anodized aluminum membranes as well as membranes fabricated by the phase inversion techniques) with a layer of stimuli-sensitive polymer chains (brush) or a stimuli-sensitive cross-linked polymer network (gel). See Osada, Y., Honda, K., and Ohta, M.; Kontturi, K., Mafe, S., Manzanares, J. A., Svarfvar, B. L., and Viinikka; Mika, A. M., Childs, R. F., Dickson, J. M., Mccarry, B. E., and Gagnon, D. R.; Ito, Y., Park, Y. S., and Imanishi, Y.; Iwata, H., Hirata, I., and Ikada, Y.; Peng, T., Cheng, Y. L.; and Ito, T., Hioki, T., Yamaguchi, T., Shinbo, T., Nakao, S., and Kimura, S.; Iwata, H., Oodate, M., Uyama, Y., Amemiya, H., and Ikada, Y.; Park, Y. S., Ito, Y., and Imanishi, Y.; and Yamaguchi, T., Ito, T., Sato, T., Shinbo, T., Nakao, S. all hereby incorporated herein by reference. In a few studies,[30-33] (See Ying, L., Wang, P., Kang, E. T., and Neoh, K. G.; Liu, G. J.; Lu, Z. H., and Duncan, S.; Zhai, G. Q., Toh, S. C., Tan, W. L., Kang, E. T., Neoh, K. G., Huang, C. C., and Liaw, D. J.; and Hester, J. F., Olugebefola, S. C., and Mayes, A. M. all hereby incorporated herein by reference.) responsive membranes are prepared in one step by the immersion precipitation of graft-copolymers with stimuli-responsive side chains. The main requirement is that the thickness of the stimuli-sensitive layer has to be comparable with the pore size. Then, the pore permeability will depend greatly on the conformational state of the chains or on the swelling degree of the gel. Responsive membranes in which permeability was dependent on pH (See Kontturi, K., Mafe, S., Manzanares, J. A., Svarfvar, B. L., and Viinikka, P.; Mika, A. M., Childs, R. F., Dickson, J. M., Mccarry, B. E., and Gagnon, D. R.; Ito, Y., Park, Y. S., and Imanishi, Y.; Iwata, H., Hirata, I., and Ikada, Y.; and Peng, T., and Cheng, Y. L. Ying, L.; Wang, P.; Kang, E. T., Neoh, K. G., Liu, G. J., Lu, Z. H., and Duncan, S.; and Hester, J. F., Olugebefola, S. C., and Mayes, A. M.: all hereby incorporated herein by reference.) and/or ionic strength, Kontturi, K., Mafe, S., Manzanares, J. A., Svarfvar, B. L., and Viinikka, P. and Zhai, G. Q., Toh, S. C., Tan, W. L., Kang, E. T., Neoh, K. G., Huang, C. C., and Liaw, D. J.) presence of specific ions,[26,31] (See Ito, T.; Hioki, T., Yamaguchi, T., Shinbo, T., Nakao, S., Kimura, S.; and Zhai, G. Q., Toh, S. C., Tan, W. L., Kang, E. T., Neoh, K. G., Huang, C. C., and Liaw, D. J.) temperature, (See Peng, T., Cheng, Y. L., Ito, T., Hioki, T., Yamaguchi, T., Shinbo, T., Nakao, S., and Kimura, S.; Iwata, H., Oodate, M., Uyama, Y., Amemiya, H., Ikada, Y., and Park, Y. S., Ito, Y., and Imanishi, Y. all hereby incorporated herein by reference.) and the strength of an applied electric field (See Ly, Y., and Cheng, Y. L. hereby incorporated herein by reference.) have been reported.

Recently, we reported a novel method for the fabrication of responsive polymer gel membranes. See Tokarev, I., Orlov, M., and Minko, S. hereby incorporated herein by reference. The membranes are deposited as thin films on solid substrates from a solution containing poly (2-vinylpyridine) (P2VP) and 1,4-diodobutane (DIB). It is noteworthy that DM had a two-fold function: it served as a porogen and as a cross-linker for P2VP. Because P2VP is a weak cationic polyelectrolyte, its cross-linked network (gel) demonstrates pH-dependent swelling properties. We observed the reversible contraction of the pores of membranes subjected to acidic water, which was caused by swelling of the P2VP gel. Unlike, the responsive membranes previously reported in the literature, the P2VP gel membranes change the pore size by expansion/contraction of their entire body. We demonstrated that the thin film membranes could be easily transferred onto a surface of commercial track etch membranes to produce hybrid membranes with pH-controlled water permeability.

In this application, we focus on aspects related to the fabrication of the P2VP gel membranes. In particular, we discuss the possible mechanism of the pore formation and demonstrate that humidity is essential for the formation of pores in the P2VP layers.

Prior to this disclosure a membrane body either was not permeable and responsive layer was on the wall of the pores. The possibility to regulate an upper limit of pore size was limited by the size diameter of pores in the rigid matrix. In permeable gels, the possibility to regulate pore size was limited to the distance between cross linking points in the network.

The object of the present invention is concerned with a stimuli-responsive (SR) polymer membrane and method of making the same. The method of making the membrane is new. The entire body of the responsive membrane is a gel. Gels are used as membranes because they are permeable-swollen network. This disclosure discusses a new combination of cylindrical pores in a swollen network. When the network swells or shrinks the cylindrical pores open or close. Thus, inside the network, one can introduce ligands, function groups which due to specific interaction with some signaling molecules in the surrounding environment can cause swelling or shrinking the membrane and this way they open or close pores.

With cylindrical pores in a gel there is the ability to regulate pore size in a broad range and an ability to arrange response by adding some functional groups inside the gel body.

SUMMARY OF INVENTION

The object of the present invention is concerned with a stimuli-responsive polymer membrane and method of making the same. The method and making the membrane is a new one. The entire body of the responsive membrane is a gel. Gels are used as membranes because they are permeable-swollen network. This disclosure discusses a new combination of cylindrical pores in a swollen network. When the network swells or shrinks the cylindrical pores open or close. Thus, inside the network, one can introduce ligands, function groups which due to specific interaction with some signaling molecules in the surrounding environment can cause swelling or shrinking the membrane and this way they open or close pores. With cylindrical pores in a gel there is the ability to regulate pore size in a broad range and an ability to arrange response by adding some functional groups inside the gel body.

BRIEF DESCRIPTION OF DRAWINGS

The foregoing aspects and many of the attendant advantages of this invention will become more readily appreciated as the same becomes better understood by reference to the following detailed description, when taken in conjunction with the accompanying drawings, wherein:

FIGS. 4a,b,c, and d illustrate the SPM topography images of qPVP membranes spin-coated from solutions with the qPVP/DIB weight ratios of 1:3 (a), 1:4 (b), 1:6 (c) and 1:9 (d);

FIGS. 5a and b illustrate the SPM topography images with the cross-section profiles of the cross-linked qPVP membrane (55% RH) in water of pH 3 (a) and pH 2 (b);

DETAILED DESCRIPTION

A. Fabrication of a Responsive Membrane

The main steps in the fabrication of the SR polymer membrane are demonstrated on the example of a pH-sensitive polyelectrolyte. A casting solution is prepared as follows. A SR polymer, poly(2-vinylpyridine) (PVP, $M_w$=159 000), is dissolved in a solvent mixture composed of nitromethane and tetrahydrofuran to form a 2% wt. solution. Then, the porogen, 1,4-diiodobutane (DIB), in the amount of three times the weight of PVP is added to the solution. DIB also served as a cross-linker for PVP, because the iodine end groups of DIB molecules allowed for its binding to nitrogen of the pyridine rings of PVP due to the quaternization reaction. The quaternization reaction is facilitated by heating the solution at 55° C. for 2 h.

Figure 1:
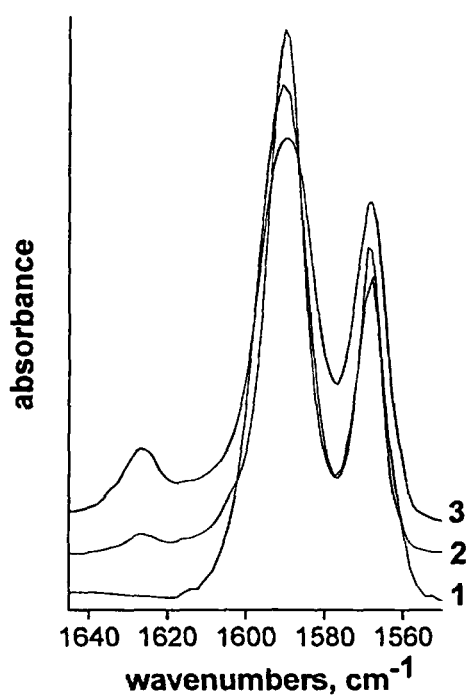
FIG. 1 illustrates an IR spectrum of P2VP as is (1), after quaternization with DIB for 2 h (the quaternization degree is 11%) (2) and the subsequent temperature annealing for 48 h (the quaternization degree is 23%) (3)

The fraction of the quaternized vinylpyridine monomeric units of PVP, or the quaternization degree, is determined with FTIR spectroscopy. FIG. 1 shows the infrared spectra of non-quaternized PVP, quaternized PVP (qPVP) that is precipitated from the solution and the latter after temperature annealing at 120° C. for 48 h. The adsorption bands at 1590 and 1569 $cm^{-1}$ which arise from the vibrations of the C=C double bonds in the pyridine ring are strongly affected by the quaternization reaction. Their intensity decreases with the growth of the reaction conversion. At the same time a new absorption band centered at 1627 $cm^{-1}$ evolves. Such new bands can be clearly seen on the spectra of qPVP as illustrated in FIG. 1. The calculations show that the quaternization degrees of qPVP before and after the temperature annealing differ twice (11% and 23% respectively). This result indicates that in the solution DIB molecules bind to PVP chains preferably by one end, forming pendant cross-linkable groups. Upon temperature annealing, the free end groups of DIB react with qPVP forming cross-links.

FIG. 1 illustrates an IR spectrum of P2VP as is (1), after quaternization with DIB for 2 h (the quaternization degree is 11%) and (2) the subsequent temperature annealing for 48 h (the quaternization degree is 23%) (3).

The solution containing qPVP and unreacted DIB is used for casting of membranes. The membranes can be prepared by spin- or dip-coating on a surface of clean Si wafers and Si wafers modified with various self-assembled monolayers, coated with gold and polymer layers. The deposition is carried out inside an environmental chamber.

Figure 2:
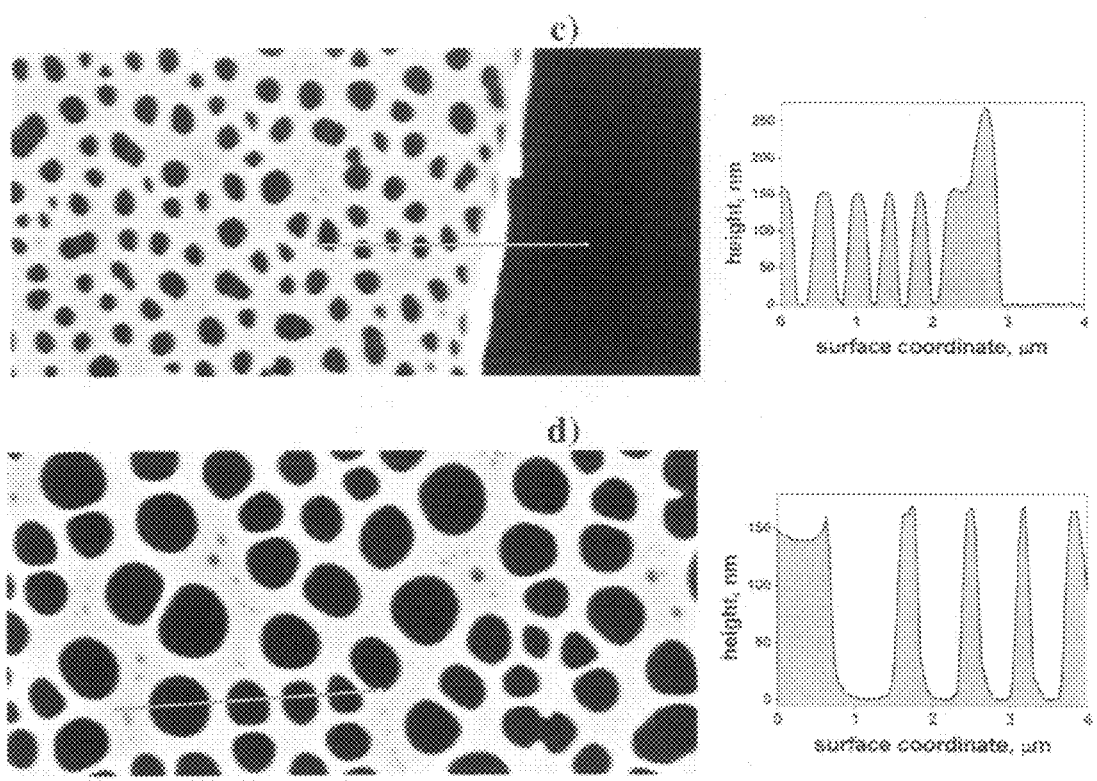
FIGS. 2a,b,c, and d illustrate the SPM topography images with the cross-section profiles of qPVP membranes spin-coated at a RH of 30% (a), 45% (b), 55% (c) and 75% (d)

The morphology of qPVP membranes spin-coated from the solution depended on a relative humidity (RH) of air. The membranes are deposited in the RH range from 30% to 75%. FIG. 2 presents the characteristic Surface Probe Microscopy (SPM) topography images of membrane surfaces. The results of the statistical analysis of the images are displayed in FIG. 3. There is a strong dependence of a pore size and pore density on the RH. The film deposited at 30% RH is characterized by the relatively small pore size (ca. 84 nm) and the high pore density. At a RH above 45% the pore size become comparable to the film thickness (ca. 160 nm). However, only a small fraction of the pores crosses the film from the top to the bottom. At 55% RH, the average pore depth becomes comparable with the film thickness. Furthermore, all films deposited at RH above 55% demonstrated continuous pores. The qPVP films with the continuous pores are regarded bellow as membranes.

FIG. 2 illustrates the SPM topography images with the cross-section profiles of qPVP membranes spin-coated at a RH of 30% (a), 45% (b), 55% (c) and 75% (d). The image size is 10×5 $\mu m^2$. The green lines show the locus of the profile. The profile in the image (c) approaches the film scratch to demonstrate that the pores cross the membrane down to the substrate.

Figure 3:
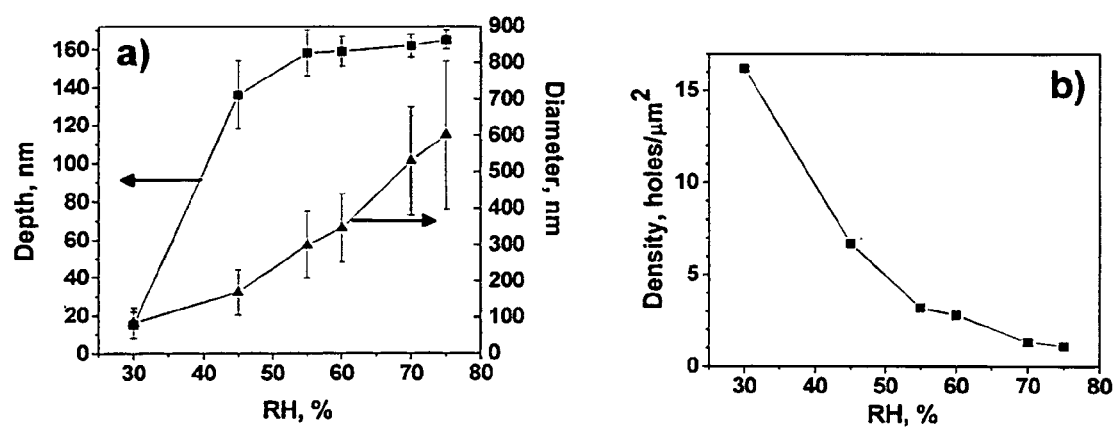
FIGS. 3a and b illustrate the statistical analysis of the pore morphology of qPVP membranes visualized by SPM: dependence of the average diameter and depth of pores (a) and pore density (i.e. number of pores per square micron of the film surface (b) on RH.

FIG. 3 illustrates a statistical analysis of the pore morphology of qPVP membranes visualized by SPM: dependence of the average diameter and depth of pores (a) and pore density (i.e. number of pores per square micron of the film surface (b) on RH.

The pore size depends also on a ratio between qPVP and DIB in a casting solution. The SPM images in FIG. 4 show the increase in the pore size with increase in the weight fraction of DIB. The average pore size can be tuned in the range from 200 nm to 1.5 mm by changing the air humidity and the qPVP/DIB ratio.

FIG. 4 illustrates the SPM topography images of qPVP membranes spin-coated from solutions with the qPVP/DIB weight ratios of 1:3 (a), 1:4 (b), 1:6 (c) and 1:9 (d). The image size is 20×20 µm².

In the following sections, we will demonstrate that the pore size and permeability of the SR polymer membrane can be changed by applying external stimuli. For all experiments, the cross-linked qPVP membranes deposited at 55% RH are used.

B. Control Over the Pore Size of the qPVP Membrane by pH

The qPVP membrane shows pH-dependent swelling properties attributed to the protonation and deprotonation of nitrogen of the pyridine rings. Thus, the membrane subjected to water of pH 5.5 showed no significant swelling. On the contrary, in acidic water of pH 2 and pH 3, the membrane's thickness increased by 1.9 and 2.4 times, respectively. The SPM topography images presented in FIG. 5 illustrates that the swelling of the membrane also leads to the contraction of the pores. The analysis of the image of the membrane in water of pH 2 suggests that most of the pores (>97%) are closed. The same analysis performed for the SPM image of the membrane in the acidic water of pH 3 gives only 80% of the closed pores.

FIG. 5 illustrates the SPM topography images with the cross-section profiles of the cross-linked qPVP membrane (55% RH) in water of pH 3 (a) and pH 2 (b). The image size is 20×10 m². The green lines show the locations of the profiles.

C. Permeability of a Membrane to Water of Different pH

Figure 6:
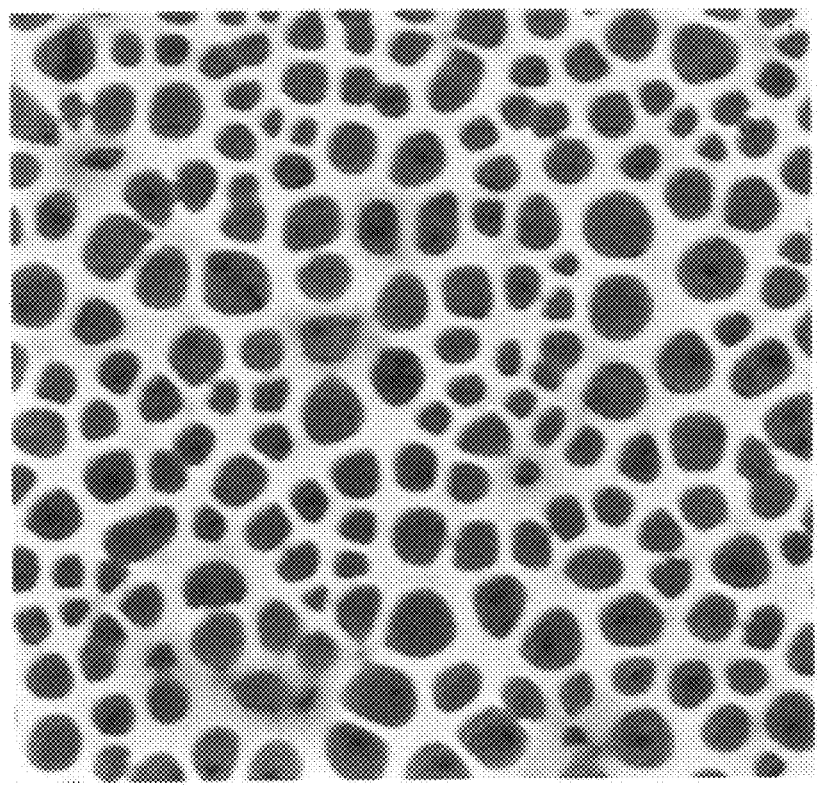
FIG. 6 illustrates the AFM topography image of the qPVP membrane deposited on top of the polyester TEM support.

Since the mechanical strength of a free-standing membrane is insufficient for its application as a filter medium, a stable porous material has to be applied as a support for the membrane. Commercial track-etch membranes (TEMs) are suitable candidates as a support primary due to their smoothness. A method of transferring a qPVP membrane on a TEM included the following steps. The qPVP membrane is prepared onto a surface of a silicon wafer pre-coated with a thick (500 nm) layer of gelatin. Then, the qPVP membrane and the TEM are brought into contact and the gelatin layer is dissolved. FIG. 6 illustrates the result of the transfer of a qPVP membrane onto the surface of a polyester TEM (Sterlitech, Co.) with the diameter of channels of 200 nm. The openings of the TEM channels are clearly seen through the larger pores of the qPVP membrane.

FIG. 6 illustrates the AFM topography image of the qPVP membrane deposited on top of the polyester TEM support. The image size is 10×10 µm².

Figure 7:
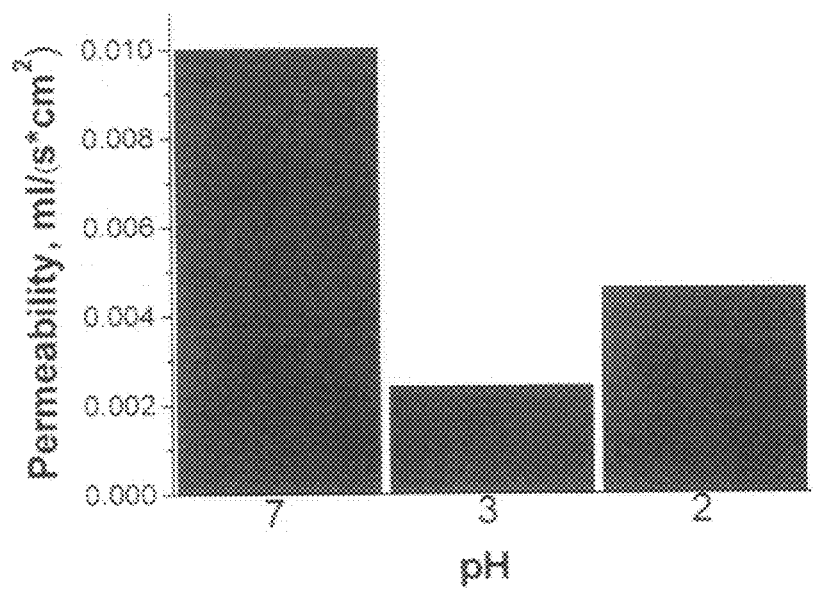
FIG. 7 illustrates the permeability of the qPVP membrane to water of different pH.

The permeability of such a qPVP membrane on a TEM support depended on pH of aqueous solution (see FIG. 7). The permeability is highest for water of pH 5.5 and it decreased with an increase in water acidity. The decrease in the permeability is attributed to the swelling of the membrane and the accompanying contraction of the pores. However, at pH<3 the permeability of the membrane somewhat increased despite of the fact that the pores became more contracted. This behavior can be explained by a leakage of water through the qPVP membranes, which becomes notable in the case of the highly swollen membrane.

FIG. 7 illustrates the permeability of the qPVP membrane subjected to water of different pH.

D. Control Over the Pore Size of the qPVP Membrane by Rinsing in Cholesterol Solutions As an example of a command chemical reaction we have selected binding of cholesterol to 2-vinylpyridine monomer units in the qPVP membrane via the formation of strong hydrogen bonds. We observed concentration-dependent swelling of the qPVP membrane subjected to chloroform solutions of cholesterol. The SPM topography images of the membrane before and after the treatment in the 0.13 M solution (See FIG. 8) show noticeable changes in the pore size and membrane thickness, resulting from the chemisorption of cholesterol molecules from the solution. The membrane porosity, defined as the area fraction of the pores, decreased by about three times. The subsequent rinsing of the membrane with chloroform leads to the release of the cholesterol molecules. As a result, the gel membrane reverted to its initial state. The process of the uptake and release of cholesterol could be repeated many times with no evident degradation of the gel membrane.

The swelling degree and associated porosity of the P2VP membrane depends greatly on the concentration of cholesterol in the solution. The average pore diameter, thickness, and porosity of the membrane soaked in cholesterol solutions of different concentrations are summarized in Table 1. An interesting observation is that at concentrations above 0.05 M the gel membrane swells preferably in the lateral direction.

Figure 8:
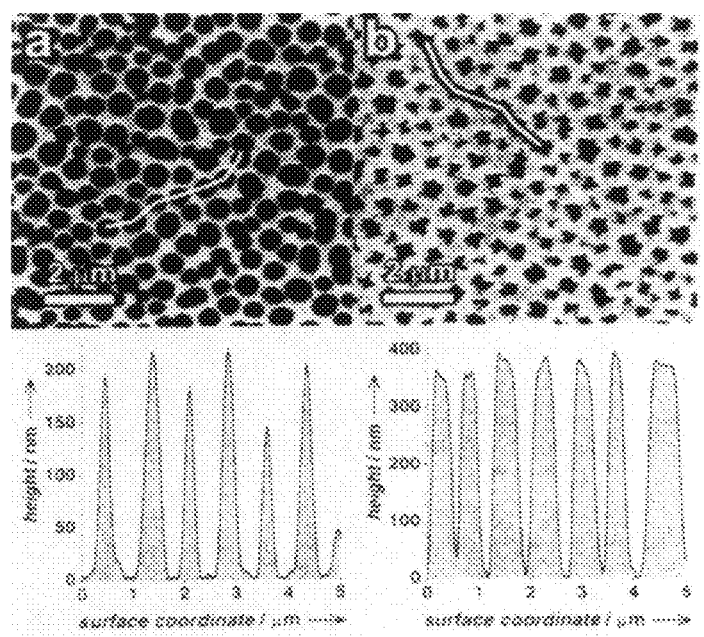
FIG. 8 illustrates the AFM topography image of the qPVP membrane with the pores filled with silica particles.

FIG. 8 illustrates the AFM topography images of the molecularly imprinted qPVP membrane after the extraction of cholesterol (a) and after the introduction of cholesterol from a 5 wt % solution. The image size is 10×10 m².

TABLE 1

Characteristics of the cross-linked P2VP membrane soaked in cholesterol solutions of different concentrations.

| Concentration of cholesterol, M | Thickness, nm | Av. pore diameter* nm | Porosity, % |
|---|---|---|---|
| 0 | 192 ± 13 | 588 ± 189 | 51.7 |
| 0.05 | 345 ± 19 | 359 ± 135 | 24.7 |
| 0.08 | 367 ± 19 | 327 ± 143 | 21.1 |
| 0.13 | 369 ± 17 | 290 ± 144 | 18.3 |

*measured at half depth of the pores.

Integration of the SR polymer membrane with electrode surfaces allows for their operation as electrochemical gates, which switch "ON"-"OFF" or tune rates of interfacial redox reactions on the electrodes depending on a concentration of a specific substance in a solution. Another possible application is the concentration-dependent release of molecules, molecule assemblies, and nanoparticles.

E. Making a Composite Membrane with Switchable Wetting Properties

The ability of a qPVP membrane to undergo significant morphological changes in response to a change of acidity of water can be used to fabricate surfaces with regulated wettability. Of particular interest is the modification of a membrane in such a way that its surface becomes hydrophilic when exposed to neutral water and hydrophobic when exposed to acidic water. Such wetting behavior is opposite to what is observed for a qPVP membrane described in Section A. The typical contact angles of neutral water and water of pH 2 on a PVP surface are ca. 70° and 15-20°, respectively.

The modification of the wetting properties of the PVP membrane is performed as follows. In the first step, the top of the membrane is covered with a hydrophobic layer. The surface-attached hydrophobic layer is obtained by applying two different deposition techniques. First, the layer-by-layer technique is used to adsorb a PSS layer onto a surface of the qPVP membrane. This is done for short time (10 s) from an aqueous solution of pH 4-5 to avoid adsorption of PSS on the pore walls. The PSS layer changes the charge of the membrane surface from positive to negative. This step is followed by dip-coating a layer of poly(butadiene-block-4-vinylpyridine) (PBu-b-P4VP) from the interface of two liquid phases: toluene and water. The upper phase is toluene which is a solvent for PBu and a nonsolvent for P4VP, while the lower phase is acidic water (pH 3) which is a solvent of P4VP and a nonsolvent for PBu. Therefore, (PBu-b-P4VP) occupies the interface with the PBu block in toluene and the P4VP block in acidic water. The qPVP membrane that passes through the water-toluene interface interacts with the positively charged P4VP blocks which form a polyelectrolyte complex with PSS. As a result, the PBu blocks occupy the top of the membrane producing the hydrophobic layer. Subsequently, the PBu layer is cross-linked by the temperature annealing. The surface of the modified qPVP membrane showed hydrophobic properties in the wide range of pH values (the contact angle of 115°).

In the next step, silica particles (the diameter of 200 nm) suspended in water of pH 4 are allowed to adsorb on the surface of the qPVP membrane. The SPM topography image of the qPVP membrane after adsorption of the particles is demonstrated in FIG. 9. The image shows that the silica particles preferentially adsorb inside the pores of the membrane. The top of the membrane is indeed covered with the hydrophobic layer which prevents the particle adsorption. Since the silica particles are thicker than the dry membrane (160 nm), they protrude from the membrane. Wettability of the membrane surface after the particle deposition is dependent on pH of water. Neutral water had the lower contact angle (75°) than the acidic water (95° for pH 2). The higher contact angle for acidic water is explained by swelling the qPVP membrane which hides the hydrophilic silica particles under the hydrophobic PBu layer.

Figure 9:
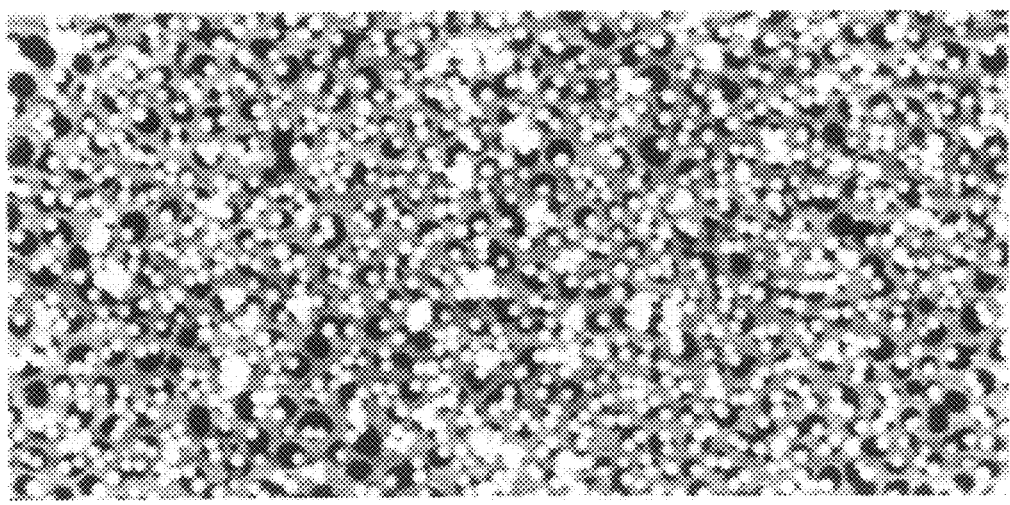
FIG. 9 illustrates the AFM topography images of the molecularly imprinted qPVP membrane after the extraction of cholesterol (a) and after the introduction of cholesterol from a 3 wt % solution.

FIG. 9 illustrates the AFM topography image of the qPVP membrane with silica particles immobilized inside the membrane's pores. The image size is 20×15 µm².

F. Control Over the Pore Size of the qPVP Membrane Using Enhanced Transmission Surface Plasmon Spectroscopy The swelling state of the qPVP membranes can be monitored using enhanced transmission surface plasmon spectroscopy. The membrane is deposited onto a glass slide covered with gold nanoislands. The membranes are immersed in 0.014 wt % aqueous solution of $HAuCl_4$ overnight to allow the complexation between the gold salt and PVP. Afterwards, the salt is reduced in 1 wt % aqueous solution of sodium citrate, which is brought to boil, for 3 min. The spectra of the composite qPVP/nanoparticles membrane in the dry state and in neutral water and water of pH 3.0 are presented in FIG. 10. A 22 nm shift of the absorbance maximum upon change of pH is clearly observed on the spectra. The shift is attributed to an increase in the inter-particle distance as a result of the swelling of the membrane in acidic water. The changes in spectra are reversible as proven by multiple cycling between pH 7.0 and 3.0. The layer of the gold nanoislands is an essential component of the given optical configuration, because it enhances the intensity and the shift of the absorbance maximum and thus improves the detection sensitivity.

Figure 10:
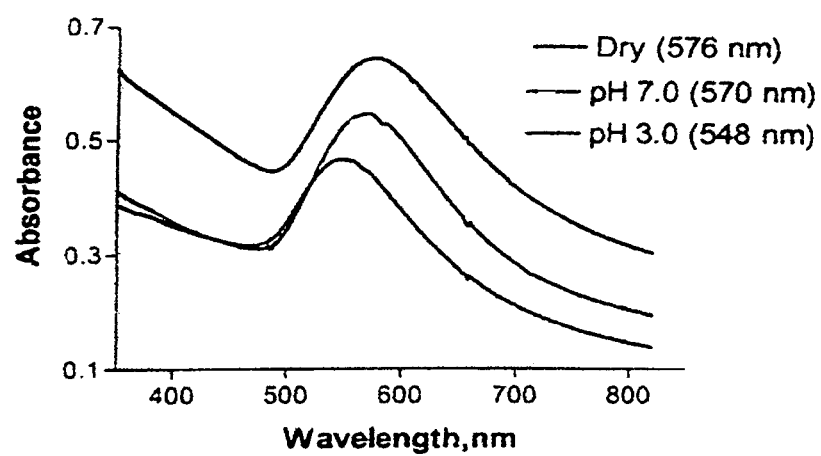
FIG. 10 illustrates a Plasmon resonance spectra of the qPVP/Au nanoparticles composite membrane prepared on a glass substrate covered with the gold nanoislands in the dry state and subjected to water of pH 7.0 and 3.0.

FIG. 10 illustrates the plasmon resonance spectra of the qPVP/Au nanoparticles composite membrane prepared on a glass substrate covered with the gold nanoislands in the dry state and subjected to water of pH 7.0 and 3.0.

G. Reversible Opening/Closing of Membrane Pores

The reversible opening/closing of the membrane pores is induced by the specific interaction of the membrane with various substrates (organic or bioorganic substances, e.g. cholesterol). The extent of the pores opening/closing is controlled by the concentration of the substrate. The present system can be considered as a membrane with the switchable/tunable porosity controlled by chemical substrates.

Figure 11:
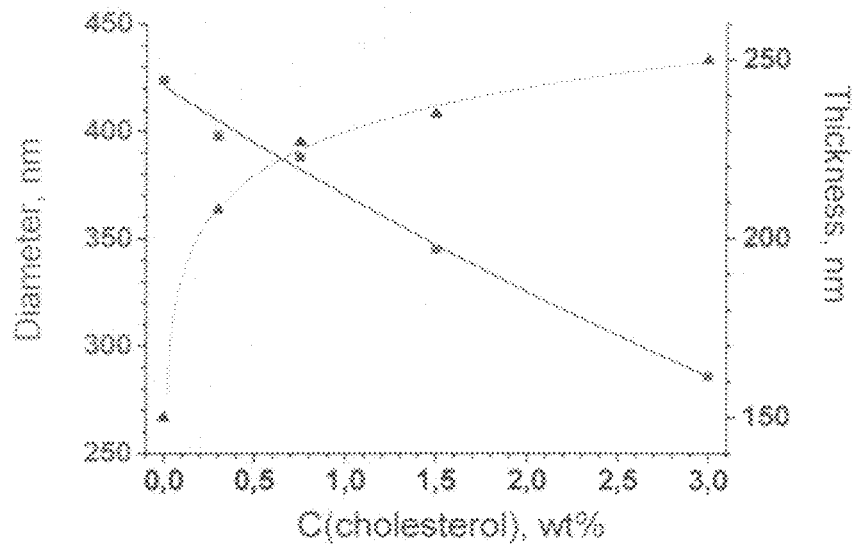
FIG. 11 illustrates the dependence of the thickness and the pore size of the molecularly imprinted qPVP membrane on the concentration of cholesterol.
Figure 12:
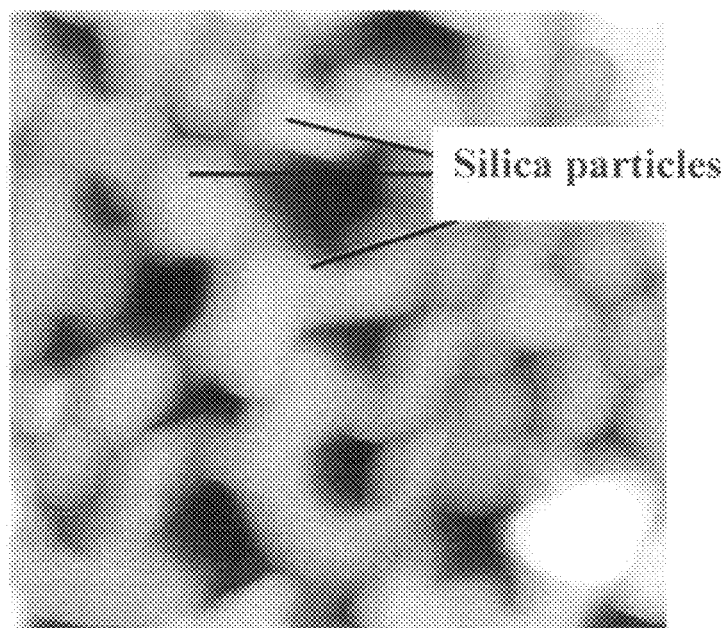
FIG. 12 illustrates an AFM image of silica particles, trapped in the membrane's pores after the deposition of the membrane in the 3% wt. solution of cholesterol.

For example, specific binding of cholesterol to the membrane pores results in the decrease of the pores diameter controlled by the concentration of cholesterol, as shown on FIG. 11. The cholesterol binding proceeds upon the membrane soaking in a chloroform solution of cholesterol resulting in swelling of the PG-membrane, decrease of the pore diameter and, therefore, decrease of the membrane porosity. The change of the PG-membrane structure upon uptake of cholesterol is followed by AFM imaging, observing the increase of the membrane thickness (pore depth) and decrease of the pore diameter, FIG. 12. The AFM images demonstrate very pronounced sensitivity of the pore diameter to the quantity of the absorbed cholesterol, Table 2. For example, swelling of the membrane by the uptake of cholesterol from 0.13 M solution results the double increase of the dry membrane thickness (from 192 nm to 369 nm), while the pore diameter decreases by two folds (from 588 nm to 290 nm) resulting in the triple decrease of the membrane porosity from 51.7% to 18.3%. The membrane swelling induced by the chemisorption of cholesterol in the pores of the membrane is a reversible process, and the original membrane thickness/porosity is restored upon removal of cholesterol from the membrane by washing in chloroform. The shrinking/swelling process can be cycled several times without degradation of the membrane. It should be noted, that the PG-membrane treatment with the cholesterol derivative (2), having no free hydroxyl groups, does not result in the membrane swelling, thus confirming the selectivity of the membrane to the substrate controlling the membrane porosity.

Figure 13:
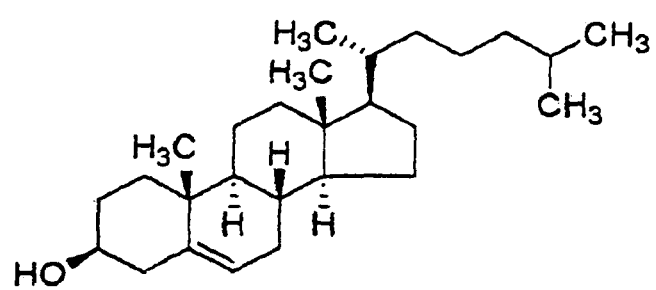
FIG. 13 illustrates cholesterol as an example substrate that controls reversible opening/closing of the membrane pores'
Figure 14:
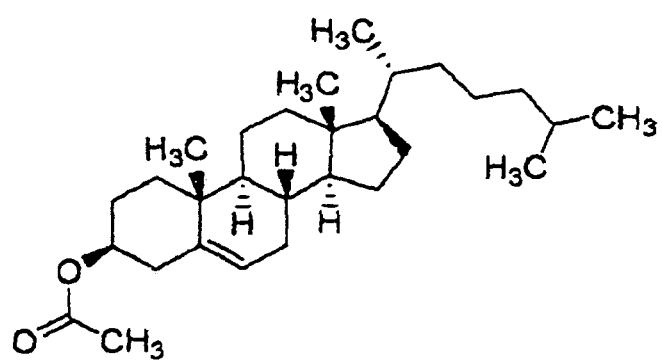
FIG. 14 illustrates hydroxyl-free cholesterol derivative control material that does not induce opening/closing the pores.

FIG. 13 illustrates cholesterol as an example substrate that controls reversible opening/closing of the membrane pores. FIG. 14 illustrates a hydroxyl-free cholesterol derivative a control material that does not induce opening/closing the pores.

Figure 15:
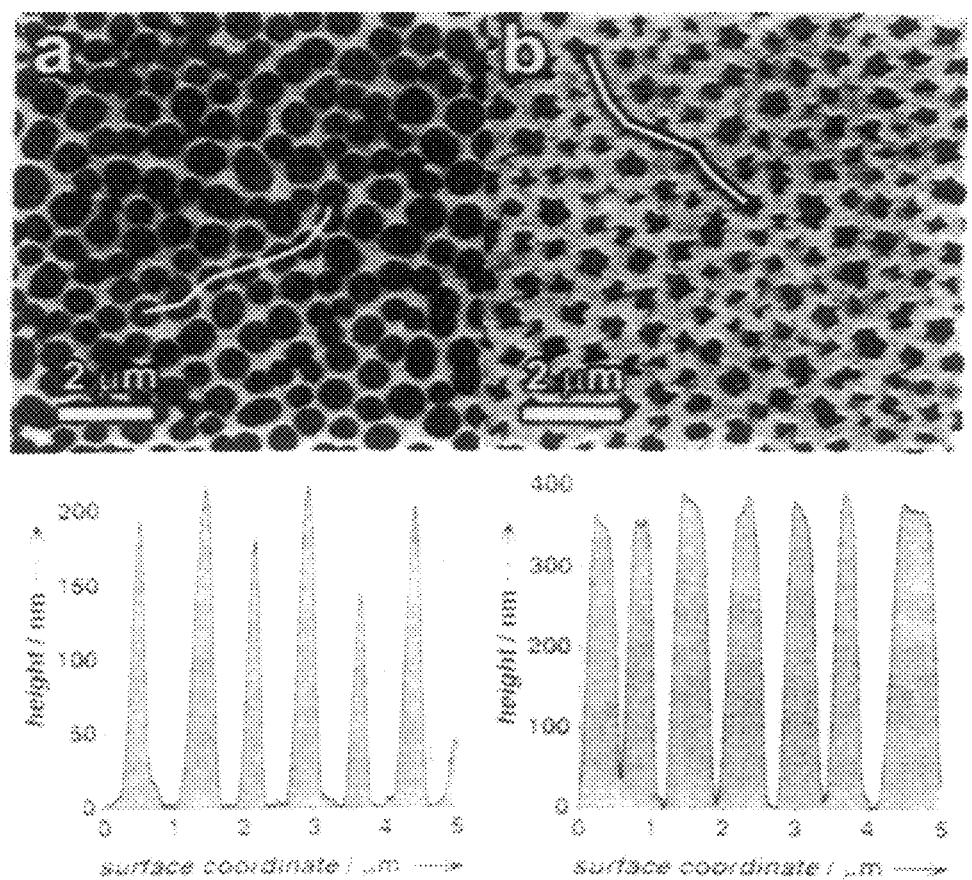
FIGS. 15a and b illustrate SPM topography images with the corresponding cross-sectional profiles of the cross-linked PG-membrane before (a) and after (b) the immersion in a 0.13 M cholesterol solution in chloroform.

FIG. 15 illustrates the SPM topography images with the corresponding cross-sectional profiles of the cross-linked PG-membrane before (a) and after (b) the immersion in a 0.13 M cholesterol solution in chloroform. The lines show the location of the cross-sectional profiles.

Figure 16:
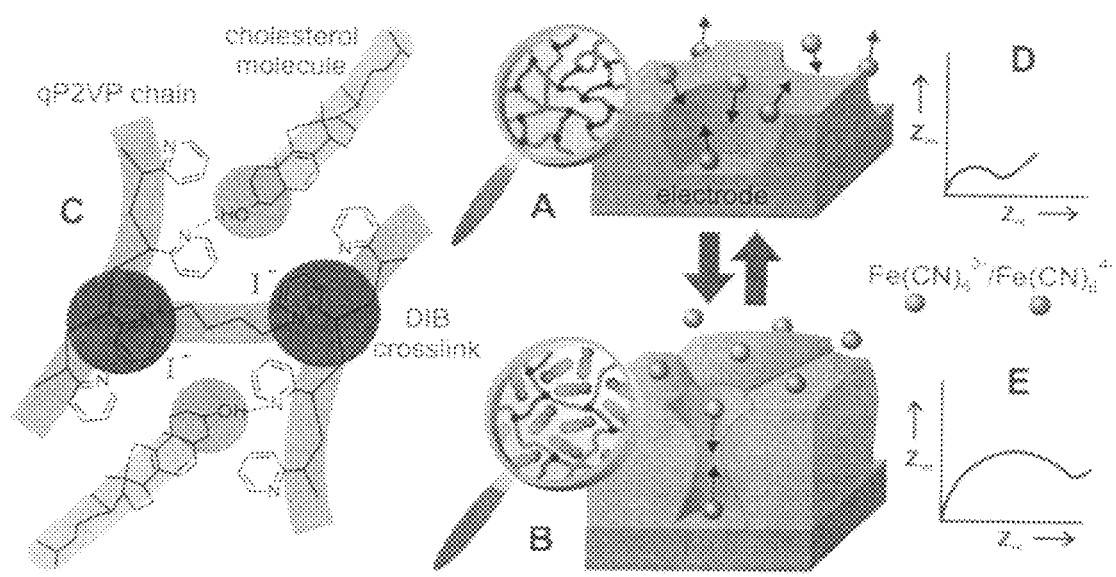
FIG. 16 illustrates a scheme showing the specific interaction of the membrane with cholesterol resulting in the controlled reversible change of the membrane porosity.

FIG. 16 illustrates a scheme showing the specific interaction of the membrane with cholesterol resulting in the controlled reversible change of the membrane porosity: A) Open pores in the absence of cholesterol; B) Closed pores in the presence of cholesterol; C) Chemical structure of the pores and the mechanism of the cholesterol binding; D) Impedance (Nyquist plot) of the membrane-modified electrode in the presence of the open pores; E) Impedance (Nyquist) plot of the membrane-modified electrode in the presence of the closed pores.

Table 2 portrays the average diameter and depth of the pores and the porosity of the cross-linked PG-membrane treated in chloroform solutions of cholesterol. The AFM topography images are used to acquire the parameters.

TABLE 2

| Concentration of cholesterol | Pore depth, nm | Pore diameter*, nm | Porosity*, % |
|---|---|---|---|
| 0 | 192 ± 13 | 588 ± 189 | 51.7 |
| 0.08M | 345 ± 19 | 359 ± 135 | 24.7 |
| 0.13M | 369 ± 17 | 290 ± 144 | 18.3 |

*measured at half depth of the pores.

H. The Membrane with a Switchable/Tunable Porosity

The membrane with a switchable/tunable porosity is applied as an electrochemical gate controlling the rate of electrochemical (or bioelectrochemical) reactions. The electrochemical gate can be applied in various electrochemical systems, e.g. in (bio)sensors and (bio)fuel cells.

Figure 17:
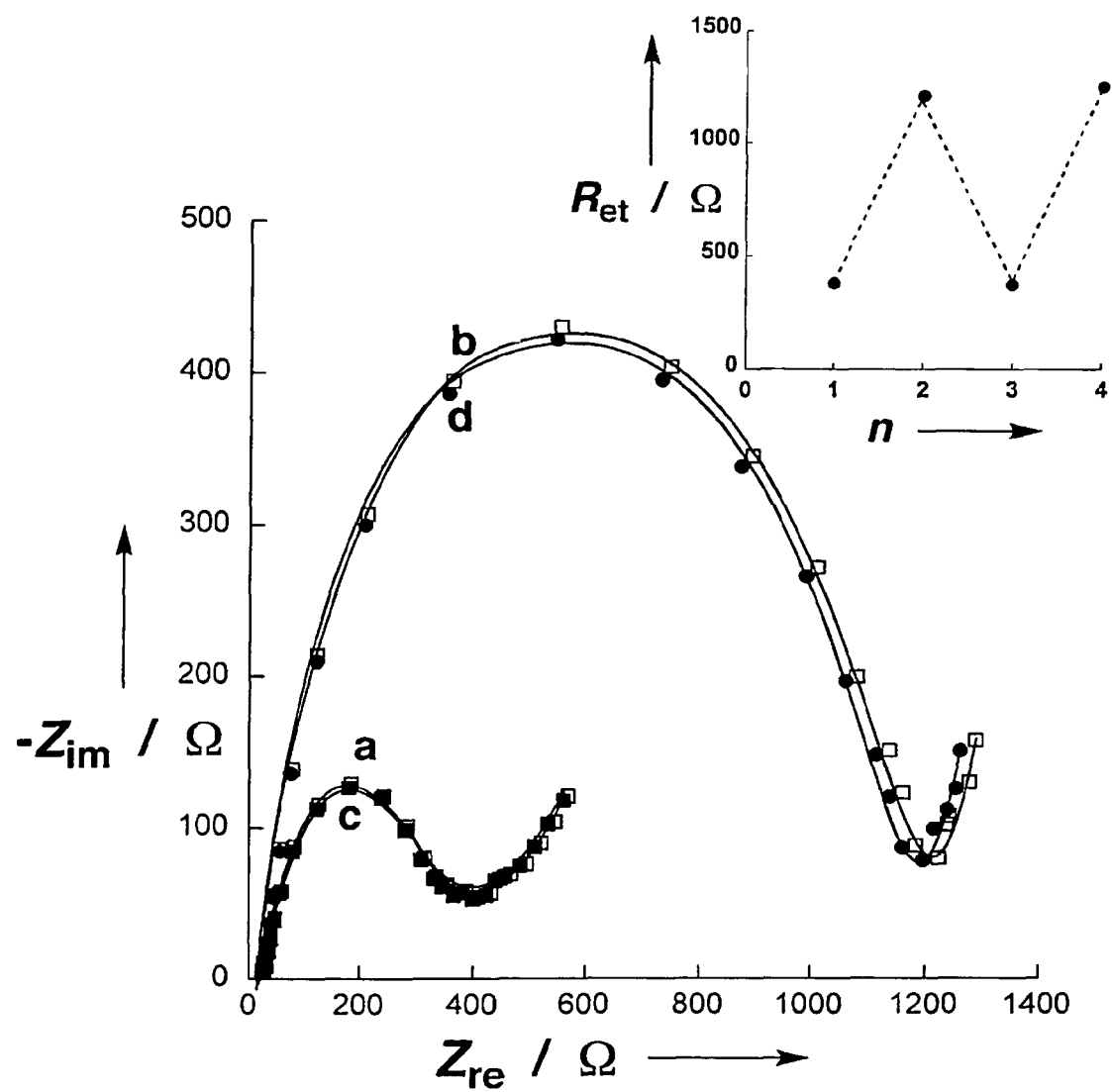
FIG. 17 illustrates Nyquist plots ($Z_{im}$ vs $Z_{re}$) for the Faradaic impedance measurements performed on the PG-membrane-modified Au electrode (solid lines correspond to the fit of the experimental points to the theoretical equivalent circuitry) and FIG. 18 illustrates Nyquist plots ($Z_{im}$ vs $Z_{re}$) for the Faradaic impedance measurements performed on the PG-membrane-modified Au electrode (solid lines correspond to the fit of the experimental points to the theoretical equivalent circuitry).
Figure 18:
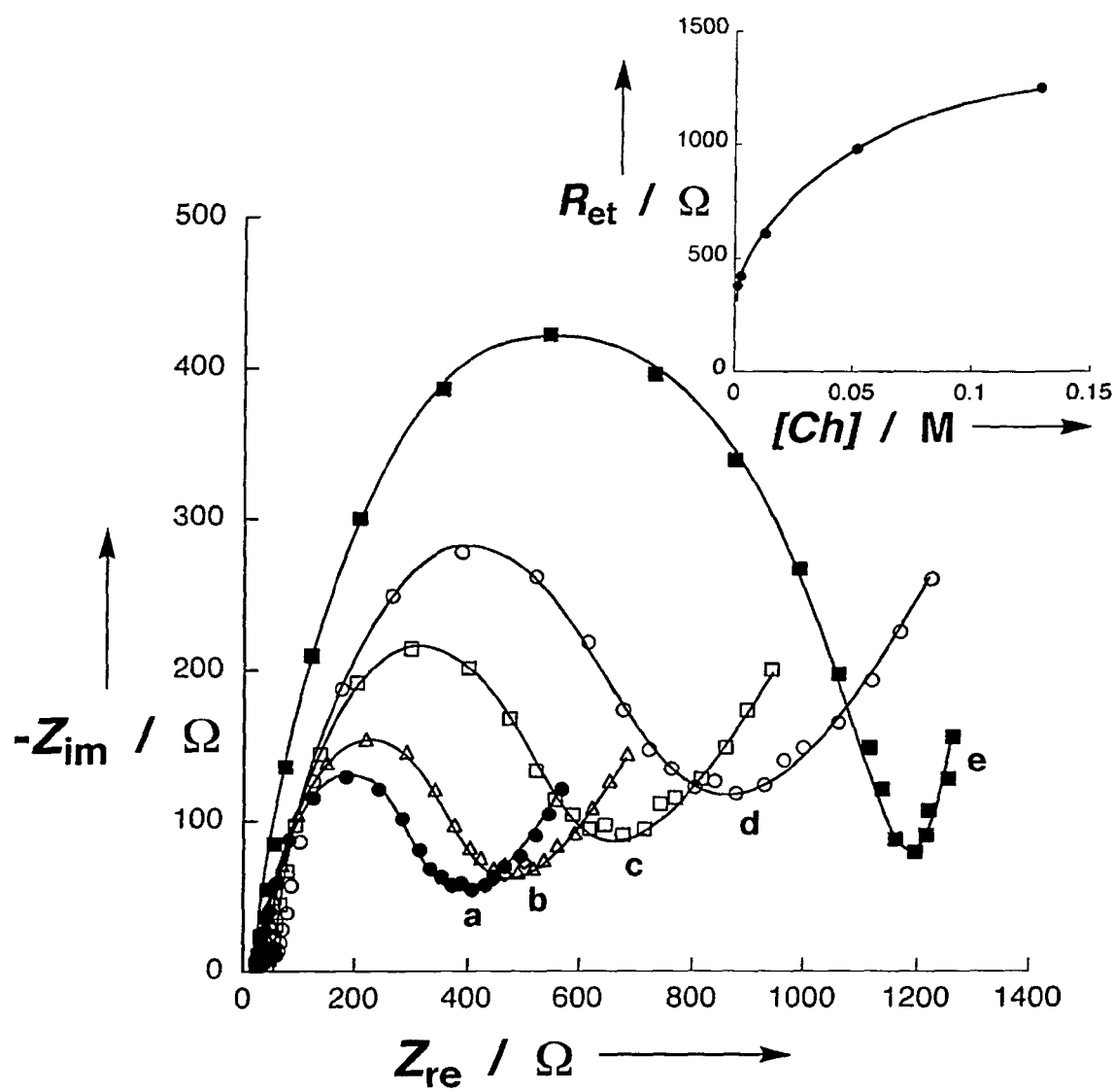

For example, the performance of the signal-responsive membrane as an electrochemical gate, which controls interfacial redox processes, is studied using Faradaic impedance spectroscopy. The Faradaic impedance spectra are recorded in the presence of a soluble redox probe $[Fe(CN)_6]^{3-/4-}$, thus reflecting the permeability of the switchable/tunable PG-membrane for the diffusional redox species. The obtained impedance spectra are presented in the form of the complex plane graphs (Nyquist plots), where the semicircle domains reflect the electron transfer resistance values, $R_{et}$, for the electrochemical processes. Since that the electrochemical process proceeds through the open channels of the membrane, we can associate the electron transfer resistance, $R_{et}$, derived from the impedance spectra with the total area of the open pores in the PG-membrane: the $R_{et}$ value should increase when the pores are closing and decrease upon opening of the pores. Indeed, this is demonstrated by the experiment. FIG. 17 shows reversible changes of the impedance spectra upon shrinking the PG-membrane in the presence of cholesterol and after washing it from the membrane, respectively. FIG. 17, inset, shows the reversible switching of the $R_{et}$ between high and low values derived from the spectra corresponding to the low and high membrane permeability for the soluble redox probe, respectively. Since the shrinking process depends on the cholesterol amount associated with the PG-membrane, the extent of the pores closing can be controlled by the used cholesterol concentration. FIG. 18 shows the impedance spectra obtained after the deposition of cholesterol onto the PG-membrane from chloroform solutions with different concentrations of cholesterol. The $R_{et}$ values derived from the impedance spectra show the consistent dependence on the cholesterol concentration coming to the saturation above 0.1 M of cholesterol, FIG. 18, inset. This demonstrates that the cholesterol-induced shrinking of the membrane pores can be used not only to switch "ON"-"OFF" the electrochemical reaction, but also to tune the extent of the allowed electrochemical process.

FIG. 17 illustrates Nyquist plots ($Z_{im}$ vs $Z_{re}$) for the Faradaic impedance measurements performed on the PG-membrane-modified Au electrode (solid lines correspond to the fit of the experimental points to the theoretical equivalent circuitry): a) in the absence of cholesterol, b) after the electrode soaking in 0.13 M cholesterol solution in chloroform for 5 minutes, c) after washing cholesterol from the membrane in chloroform, d) after the second treatment of the modified electrode with the cholesterol solution. The data are recorded in 0.1 M phosphate buffer, pH=7.0, in the presence of 10 mM $K_3[Fe(CN)_6]/K_4[Fe(CN)_6]$, 1:1, bias potential of 0.17 V. Inset: The reversible change of $R_{et}$ derived from the impedance spectra upon stepwise chemisorption (increased $R_{et}$ value) and removal (decreased $R_{et}$ value) of cholesterol.

FIG. 18 illustrates Nyquist plots ($Z_{im}$ vs $Z_{re}$) for the Faradaic impedance measurements performed on the PG-membrane-modified Au electrode (solid lines correspond to the fit of the experimental points to the theoretical equivalent circuitry): a) in the absence of cholesterol, and after the electrode soaking for . . . minutes in a cholesterol solution in chloroform with the concentration of: b) 0.015 M, c) 0.03 M, d) 0.06 M, e) 0.13 M. The data are recorded in 0.1 M phosphate buffer, pH=7.0, in the presence of 10 mM $K_3[Fe(CN)_6]/K_4[Fe(CN)_6]$, 1:1, bias potential of 0.17 V. Inset: The $R_{et}$ values increasing upon elevation of the cholesterol concentration.

I. Summary of the Detailed Description

This disclosure has discussed a stimuli-responsive (SR) polymer membrane with a two-dimensional array of circular microscopic pores and a method of making the same. The method includes: preparing a solution composed of a SR polymer with pendant cross-linkable groups and a liquid pore-forming additive (porogen) which solubility can be strongly decreased by addition of a small amount of a nonsolvent; casting of the above solution onto a surface of a solid or polymer substrate to obtain a microporous thin film membrane formed due to the nonsolvent-induced microphase separation of the porogen and the subsequent precipitation of the polymer and evaporation of the porogen; controlling over the pore size of the membrane by varying a ratio between the SR polymer and the porogen in the solution and/or a vapor pressure of the nonsolvent during the casting process; cross-linking of the SR polymer constituting the membrane to produce a polymer network (SR polymer gel).

A method for the regulation of the pores' size and permeability (for liquids, molecules, and nanoparticles) of the responsive membrane recited above performed by changing a swelling degree of said membrane upon application of specific chemical and/or physical stimuli.

A method for making a hybrid layer with stimuli-controlled surface wettability using the SR polymer membrane discussed above, wherein the method comprises the acts of: 1) modifying the membrane's surface by a layer of a hydrophilic component (polymer or surface-functionalized inorganic nanoparticles); immobilizing a hydrophobic component (polymer or surface-functionalized inorganic nanoparticles) inside the membrane's pores and modifying the membrane's surface by a layer of a hydrophobic component (polymer or surface-functionalized inorganic nanoparticles); immobilizing of a hydrophilic component (polymer or surface-functionalized inorganic nanoparticles) inside the membrane's pores.

A method for the switching of surface wettability of the hybrid layer as discussed above due to surface re-organization, the degree of exposure of the components immobilized inside the pores and on the surface of the membrane to the environment is regulated by changing a swelling degree of said membrane upon application of specific chemical and/or physical stimuli.

A method for the control of a swelling degree of the SR polymer membrane discussed above using enhanced transmission surface plasmon resonance spectroscopy, wherein said method comprises the acts of: preparing said membrane on a transparent substrate covered with gold nanoislands; dispersing gold nanoparticles in the membrane's body; monitoring a shift of the absorptivity maximum due to a change in the inter-particle distance occurring upon swelling and shrinking of the membrane's body.

The responsive membrane discussed comprises a layer of a cross-linked polyelectrolyte (gel) with a two-dimensional array of circular pores.

A method of making a responsive membrane comprising the acts of: attaching molecules of a cross-linker by one end to functional groups of a polyelectrolyte to form a cross-linkable prepolymer; preparing a solution composed of said prepolymer and a liquid low-molar mass component; casting said solution on a surface of a solid or polymer substrate to form a porous prepolymer layer (membrane) due to phase separation of said prepolymer and said low-molar mass component during a layer formation and subsequent evaporation or extraction of said low-molar mass component; controlling a pore size of said membrane by varying a ratio between said prepolymer and said low-molar mass component in said solution and/or relative humidity of air environment during said casting process; and cross-linking said prepolymer of said membrane to form a swellable polymer network (gel).

A method of the regulating of the pore sizes of a responsive membrane and its solvent permeability comprising the act of swelling said membrane in a plurality of organic solvents, aqueous media of different pH and/or ionic strength.

A method of a regulated size-dependent filtration wherein the size of particles which pass through a responsive membrane is controlled by one or more of the methods recited above.

A method of the controlled release of substances wherein the rate of the release of the substance from/through a responsive membrane is controlled by one or more of the method recited above.

A method of making a composite layer with controllable wetting of the surface using the responsive membrane discussed above, wherein said method comprises: covering a surface of the membrane by a layer of a hydrophilic polymer; introduction of hydrophobic particles with the size comparable to the pore size and larger than the membrane thickness into the membrane pores and their attachment to the pore walls and/or the membrane substrate.

A method of the regulation of surface wetting properties of the composite layer recited immediately above, wherein said method comprises: non-wetting the surface, preferentially occupied by protruding hydrophobic particles, by a solvent, in the case, when the responsive membrane does not swell in said solvent; wetting the surface preferentially occupied by a hydrophilic polymer layer by a solvent, in the case, when said membrane swells in said solvent.

A method of making a composite layer with controllable wetting of a surface comprising the acts of: using a layer of a cross-linked polyelectrolyte (gel) with a two-dimensional array of circular pores; covering a first surface of said membrane with a layer of a hydrophobic polymer; introducing hydrophilic particles with a size comparable to said pore size and larger than said membrane thickness into the membrane pores and their attachment to the pore walls and/or the membrane substrate.

The method of disclosed immediately above further comprising the acts of: wetting said surface, preferentially occupied by protruding hydrophilic particles, by a solvent, in the case, when the responsive membrane does not swell in said solvent; non-wetting said surface preferentially occupied by the hydrophobic polymer layer by a solvent, in the case, when said membrane swells in said solvent.

A method of making a responsive molecularly-imprinted membrane comprising the acts of: attaching molecules of a cross-linker by one end to functional groups of a polyelectrolyte to form a cross-linkable prepolymer; preparing a solution composed of the prepolymer and a liquid low-molar mass component; casting the solution on a surface of a solid or polymer substrate to form a porous prepolymer layer (membrane) due to phase separation of the prepolymer and the low-molar mass component during the layer formation and subsequent evaporation or extraction of the low-molar mass component; controlling the pore size of the membrane by varying the ratio between the prepolymer and the low-molar mass component in the solution and/or relative humidity of air environment during the casting process; swelling the membrane with a specific substance (including low-molar mass substances, drugs, and biomolecules); and cross-linking the prepolymer of the membrane to form a molecularly-imprinted polymer network.

The method of disclosed immediately above further comprising the act of: swelling said membrane in a solution of a specific substance.

A method of regulating size-dependent filtration wherein the size of particles which pass through a responsive membrane is controlled by swelling a membrane in a solution of a specific substance.

A method of the controlled release of substances wherein the rate of the release of the substance from/through the responsive membrane is controlled as discussed above.

A method of making a composite layer with controllable wetting of a surface using the responsive molecularly-imprinted membrane recited above, wherein the method comprises: covering a surface of the membrane by a layer of hydrophilic polymer; introduction of hydrophobic particles with the size comparable to the pore size and larger than the membrane thickness into the membrane pores and their attachment to the pore walls and/or a membrane substrate.

A method of the regulation of surface wetting properties of the composite layer recited above, wherein the method comprises: non-wetting the surface, preferentially occupied by protruding hydrophobic particles, by a solution, in the case, when said solution contains low concentration of a specific substance recognized by the responsive molecularly-imprinted membrane and said membrane is in non-swollen state; wetting the surface, preferentially occupied by the hydrophilic polymer layer, by a solvent, in the case, when said solution contains high concentration of a specific substance recognized by the responsive molecularly-imprinted membrane and said membrane is in swollen state.

A method of making a composite layer with controllable wetting of a surface using the responsive molecularly-imprinted membrane recited above, wherein the method comprises: covering a surface of the membrane with a layer of hydrophobic polymer; introduction of hydrophilic particles with the size comparable to the pore size and larger than the membrane thickness into the membrane pores and their attachment to the pore walls and/or a membrane substrate.

A method of the regulation of surface wetting properties of the composite layer recited above, wherein said method comprises: wetting the surface, occupied by preferentially protruding hydrophilic particles, by a solvent, in the case, when said solution contains low concentration of a specific substance recognized by the responsive molecularly-imprinted membrane and said membrane is in non-swollen state; non-wetting of a surface preferentially occupied by the hydrophobic polymer layer by a solvent, in the case, when said solution contains a high concentration of a specific substance recognized by the responsive molecularly-imprinted membrane and said membrane is in swollen state.

The illustrative embodiments and modifications thereto described hereinabove are merely exemplary. It is understood that other modifications to the illustrative embodiments will readily occur to persons of ordinary skill in the art. All such modifications and variations are deemed to be within the scope and spirit of the present invention as will be defined by the accompanying claims.

REFERENCES

The following references cited below are hereby incorporated herein by reference.
(1) Altinkaya, S. A.; Yenal, H.; Ozbas, B. *J Membrane Sci* 2005, 249, 163-172.
(2) Apel, P. *Radiat Meas* 2001, 34, 559-566.
(3) Yan, F.; Goedel, W. A. *Adv Mater* 2004, 16, 911-915.
(4) Yan, F.; Goedel, W. A. *Chem Mater* 2004, 16, 1622-1626.
(5) Jiang, P.; Hwang, K. S.; Mittleman, D. M.; Bertone, J. F.; Colvin, V. L. *J Am Chem Soc* 1999, 121, 11630-11637.
(6) Cassagneau, T.; Caruso, F. *Adv Mater* 2002, 14, 34-38.
(7) Park, S. H.; Xia, Y. N. *Adv Mater* 1998, 10, 1045-+.
(8) Jiang, P.; Bertone, J. F.; Colvin, V. L. *Science* 2001, 291, 453-457.
(9) Imhof, A.; Pine, D. *J. Adv Mater* 1998, 10, 697-700.
(10) Odom, T. W.; Love, J. C.; Wolfe, D. B.; Paul, K. E.; Whitesides, G. M. *Langmuir* 2002, 18, 5314-5320.
(11) Yan, X. H.; Liu, G. J.; Dickey, M.; Willson, C. G. *Polymer* 2004, 45, 8469-8474.
(12) Widawski, G.; Rawiso, M.; Francois, B. *Nature* 1994, 369, 387-389.
(13) Yabu, H.; Tanaka, M.; Ijiro, K.; Shimomura, M. *Langmuir* 2003, 19, 6297-6300.
(14) Maruyama, N.; Koito, T.; Nishida, J.; Sawadaishi, T.; Cieren, X.; Ijiro, K.; Karthaus, O.; Shimomura, M. *Thin Solid Films* 1998, 329, 854-856.
(15) Karthaus, O.; Maruyama, N.; Cieren, X.; Shimomura, M.; Hasegawa, H.; Hashimoto, T. *Langmuir* 2000, 16, 6071-6076.
(16) Srinivasarao, M.; Collings, D.; Philips, A.; Patel, S. *Science* 2001, 292, 79-83.
(17) Li, Q.; Quinn, J. F.; Caruso, F. *Advanced Materials (Weinheim, Germany)* 2005, 17, 2058-2062.
(18) Jenekhe, S. A.; Chen, X. L. *Science* 1999, 283, 372-375.
(19) Ulbricht, M. *Polymer* 2006, 47, 2217-2262.
(20) Osada, Y.; Honda, K.; Ohta, M. *J Membrane Sci* 1986, 27, 327-338.
(21) Kontturi, K.; Mafe, S.; Manzanares, J. A.; Svarfvar, B. L.; Viinikka, P. *Macromolecules* 1996, 29, 5740-5746.
(22) Mika, A. M.; Childs, R. F.; Dickson, J. M.; Mccarry, B. E.; Gagnon, D. R. *J Membrane Sci* 1995, 108, 37-56.
(23) Ito, Y.; Park, Y. S.; Imanishi, Y. *J Am Chem Soc* 1997, 119, 2739-2740.
(24) Iwata, H.; Hirata, I.; Ikada, Y. *Macromolecules* 1998, 31, 3671-3678.
(25) Peng, T.; Cheng, Y. L. *Polymer* 2001, 42, 2091-2100.
(26) Ito, T.; Hioki, T.; Yamaguchi, T.; Shinbo, T.; Nakao, S.; Kimura, S. *J Am Chem Soc* 2002, 124, 7840-7846.
(27) Iwata, H.; Oodate, M.; Uyama, Y.; Amemiya, Ikada, Y. *J Membrane Sci* 1991, 55, 119.
(28) Park, Y. S.; Ito, Y.; Imanishi, Y. *Langmuir* 1998, 14, 910-914.
(29) Yamaguchi, T.; Ito, T.; Sato, T.; Shinbo, T.; Nakao, S.-i. *J Am Chem Soc* 1999, 121, 4078-4079.
(30) Ying, L.; Wang, P.; Kang, E. T.; Neoh, K. G. *Macromolecules* 2002, 35, 673-679.
(31) Liu, G. J.; Lu, Z. H.; Duncan, S. *Macromolecules* 2004, 37, 4218-4226.
(32) Zhai, G. Q.; Toh, S. C.; Tan, W. L.; Kang, E. T.; Neoh, K. G.; Huang, C. C.; Liaw, D. J. *Langmuir* 2003, 19, 7030-7037.
(33) Hester, J. F.; Olugebefola, S. C.; Mayes, A. M. *J Membrane Sci* 2002, 208, 375-388.
(34) Ly, Y.; Cheng, Y.-L. *J Membrane Sci* 1993, 77, 99.
(35) Tokarev, I.; Orlov, M.; Minko, S. *Adv Mater* 2006, 18, 2458-2460.

We claim:

1. A method for making a stimuli-responsive (SR) polymer membrane with a two-dimensional array of circular microscopic pores comprising the acts of:
   preparing a solution composed of a SR polymer with pendant cross-linkable groups and a low-volatile liquid pore-forming additive (porogen);
   casting of said solution onto a surface of a solid or polymer substrate to obtain a microporous thin film membrane;
   decreasing solubility of said additive by adding of a small amount of a nonsolvent from vapor;
   inducing a nonsolvent-induced microphase separation of said additive in said solution followed by drying of said polymer and evaporation of said additive;
   controlling a pore size of said membrane by varying a vapor pressure of said nonsolvent during said casting process;
   cross-linking of said SR polymer constituting said membrane to produce a polymer network (SR polymer gel);
   making a hybrid layer with stimuli-controlled surface wettability using said SR polymer membrane;
   modifying said membrane's surface by a layer of a hydrophilic component (polymer or surface-functionalized inorganic nanoparticles);
   immobilizing of a hydrophobic component (polymer or surface-functionalized inorganic nanoparticles) inside said membrane's pores; and
   modifying said membrane's surface by a layer of a hydrophobic component (polymer or surface-functionalized inorganic nanoparticles);
   immobilizing a hydrophilic component (polymer or surface-functionalized inorganic nanoparticles) inside said membrane's pores.

2. The method of claim 1 further comprising the acts:
   changing a swelling degree of said membrane upon application of specific chemical and/or physical stimuli;
   regulating of said pores' size and permeability (for liquids, molecules, and nanoparticles) of said responsive membrane due to said membrane's swelling.

3. The method of claim 1 further comprising the acts of:
   preparing said membrane on a transparent substrate covered with gold nanoislands;
   dispersing gold nanoislands in said membrane's body;
   monitoring changes in a swelling degree of said SR polymer membrane, using transmission surface plasmon resonance spectroscopy, in which a shift of absorptivity maximum due to a change in an inter-particle distance occurring upon swelling and shrinking of said membrane's body is measured.

4. The method of claim 3 further comprising the acts of:
   switching surface wettability of said hybrid layer;
   reorganizing said surface,
   wherein a degree of exposure of said components immobilized inside said pores and on said surface of said membrane to an environment is regulated by changing a swelling degree of said membrane upon application of specific chemical and/or physical stimuli.

5. A method for making a stimuli-responsive (SR) polymer membrane with a two-dimensional array of circular microscopic pores comprising the acts of:
preparing a solution composed of a SR polymer with pendant cross-linkable groups and a low-volatile liquid pore-forming additive (porogen);
casting of said solution onto a surface of a solid or polymer substrate to obtain a microporous thin film membrane;
decreasing solubility of said additive by adding of a small amount of a nonsolvent from vapor;
inducing a nonsolvent-induced microphase separation of said additive in said solution followed by drying of said polymer and evaporation of said additive;
controlling a pore size of said membrane by varying a vapor pressure of said nonsolvent during said casting process;
cross-linking of the SR polymer constituting said membrane to produce a polymer network (SR polymer gel);
changing a swelling degree of said membrane upon application of specific chemical and/or physical stimuli; and
further comprising the acts of regulating of said pores' size and permeability (for liquids, molecules, and nanoparticles) of said responsive membrane due to said membrane's swelling;
controlling a swelling degree of said SR polymer membrane,
using enhanced transmission surface plasmon resonance spectroscopy,
preparing said membrane on a transparent substrate covered with gold nanoislands;
dispersing said gold nanoislands in said membrane's body;
monitoring a shift of absorptivity maximum due to a change in an inter-particle distance occurring upon swelling and shrinking of said membrane's body;
monitoring changes in a swelling degree of said SR polymer membrane, using transmission surface plasmon resonance spectroscopy, in which a shift of absorptivity maximum due to a change in an inter-particle distance occurring upon swelling and shrinking of said membrane's body is measured.

6. The method of claim 5 further comprising the acts of:
making a hybrid layer with stimuli-controlled surface wettability using said SR polymer membrane;
modifying said membrane's surface by a layer of a hydrophilic component (polymer or surface-functionalized inorganic nanoparticles);
immobilizing of a hydrophobic component (polymer or surface-functionalized inorganic nanoparticles) inside said membrane's pores; and
modifying said membrane's surface by a layer of a hydrophobic component (polymer or surface-functionalized inorganic nanoparticles);
immobilizing a hydrophilic component (polymer or surface-functionalized inorganic nanoparticles) inside said membrane's pores.

7. The method of claim 6 further comprising the acts of:
switching surface wettability of said hybrid layer;
reorganizing said surface,
wherein a degree of exposure of said components immobilized inside said pores and on said surface of said membrane to an environment is regulated by changing a swelling degree of said membrane upon application of specific chemical and/or physical stimuli.

8. A method for making a stimuli-responsive (SR) polymer membrane with a two-dimensional array of circular microscopic pores comprising the acts of:
preparing a solution composed of a SR polymer with pendant cross-linkable groups and a low-volatile liquid pore-forming additive (porogen);
casting of said solution onto the surface of a solid or polymer substrate to obtain a microporous thin film membrane;
decreasing solubility of said additive by adding of a small amount of a nonsolvent from vapor;
inducing a nonsolvent-induced microphase separation of said additive in said solution followed by drying of said polymer and evaporation of said additive;
controlling a pore size of said membrane by varying a vapor pressure of said nonsolvent during said casting process
cross-linking of said SR polymer constituting said membrane to produce a polymer network (SR polymer gel); and;
further comprising the acts of:
changing a swelling degree of said membrane upon application of specific chemical and/or physical stimuli; and
regulating of said pores' size and permeability (for liquids, molecules, and nanoparticles) of said responsive membrane due to the membrane's swelling; and
further comprising the acts of:
making a hybrid layer with stimuli-controlled surface wettability using said SR polymer membrane;
modifying said membrane's surface by a layer of a hydrophilic component (polymer or surface-functionalized inorganic nanoparticles);
immobilizing of a hydrophobic component (polymer or surface-functionalized inorganic nanoparticles) inside said membrane's pores; and
modifying said membrane's surface by a layer of a hydrophobic component (polymer or surface-functionalized inorganic nanoparticles);
immobilizing a hydrophilic component (polymer or surface-functionalized inorganic nanoparticles) inside said membrane's pores.

9. The method of claim 8 further comprising the acts of:
switching surface wettability of said hybrid layer;
reorganizing said surface,
wherein a degree of exposure of said components immobilized inside said pores and on said surface of said membrane to the environment is regulated by changing a swelling degree of said membrane upon application of specific chemical and/or physical stimuli.

* * * * *